United States Patent
Brenner et al.

(10) Patent No.: US 7,062,903 B2
(45) Date of Patent: Jun. 20, 2006

(54) DEVICE AND METHOD FOR POST-ENGINE INTRODUCTION OF AN AUXILIARY AGENT IN AN EXHAUST GAS STREAM

(75) Inventors: Frank Brenner, Remseck (DE); Johannes Schaller, Leonberg (DE); Marc Bareis, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 334 days.

(21) Appl. No.: 10/467,837

(22) PCT Filed: Feb. 1, 2002

(86) PCT No.: PCT/DE02/00370

§ 371 (c)(1),
(2), (4) Date: Dec. 23, 2003

(87) PCT Pub. No.: WO02/064954

PCT Pub. Date: Aug. 22, 2002

(65) Prior Publication Data

US 2004/0081592 A1    Apr. 29, 2004

(30) Foreign Application Priority Data

Feb. 13, 2001   (DE) ............................. 101 06 503

(51) Int. Cl.
*F01N 3/00*    (2006.01)
(52) U.S. Cl. ...................... 60/286; 60/275; 60/301; 60/303

(58) Field of Classification Search ............... 60/275, 60/286, 300, 301, 303
See application file for complete search history.

(56) References Cited

U.S. PATENT DOCUMENTS

| | | | | |
|---|---|---|---|---|
| 4,574,589 A * | 3/1986 | Hasegawa et al. | ............ | 60/286 |
| 4,576,617 A * | 3/1986 | Renevot | ...................... | 60/303 |
| 4,651,524 A * | 3/1987 | Brighton | ...................... | 60/274 |
| 4,662,172 A * | 5/1987 | Shinzawa et al. | ............. | 60/303 |
| 4,711,087 A * | 12/1987 | Kawamura | ................... | 60/286 |
| 4,991,396 A * | 2/1991 | Goerlich et al. | .............. | 60/303 |
| 5,771,689 A * | 6/1998 | Bareis et al. | ................. | 60/286 |
| 5,826,428 A * | 10/1998 | Blaschke | ...................... | 60/303 |
| 6,176,078 B1 | 1/2001 | Balko et al. | | |

FOREIGN PATENT DOCUMENTS

| | | |
|---|---|---|
| DE | 44 36 415 | 4/1996 |
| DE | 195 10 804 | 9/1996 |
| DE | 198 20 682 | 11/1998 |
| WO | 01 00310 | 1/2001 |

\* cited by examiner

*Primary Examiner*—Thomas Denion
*Assistant Examiner*—Diem Tran
(74) *Attorney, Agent, or Firm*—Kenyon & Kenyon LLP

(57) ABSTRACT

A device and a method are proposed for the introduction of a processing agent downstream of the engine, in particular a fuel, into the exhaust-gas stream of an internal combustion engine, in which a gas discharge for boosting an at least partial of the supplied processing agent is supported.

13 Claims, 2 Drawing Sheets

DEVICE AND METHOD FOR POST-ENGINE INTRODUCTION OF AN AUXILIARY AGENT IN AN EXHAUST GAS STREAM

FIELD OF THE INVENTION

The present invention is based on a device for introducing a processing agent downstream of the engine into an exhaust-gas stream.

BACKGROUND INFORMATION

From the German Published Patent Application No. 44 36 415, a device is already known in which a sheathed-element glow plug is used to supply fuel into the exhaust-gas tract in vaporized form.

SUMMARY OF THE INVENTION

The device of the present invention and the method of the present invention have the advantage over the related art that a condensing out of an already evaporated fuel in a downstream aftertreatment system may be prevented, so that the function of a catalytic converter, for example, is not detrimentally affected. On the one hand, the partial oxidation of the introduced processing agent advantageously raises the catalytic converter temperature, for example via the condensation temperature of the processing agent. On the other hand, the partially oxidized molecules of the processing agent have a lower dew point, so that the condensation is reduced by the partial oxidation, even if the exhaust-gas temperature is raised only slightly. A condensation of CO, for example, is ruled out under realistic conditions.

In an advantageous manner, means for conveying gas allow a space-saving and effective arrangement for the supply and for the oxidation via a gas discharge.

It is advantageous, in particular, to subdivide the region between the supply means and the excitation means for a gas discharge in such a way that the processing agent is first able to mix with a portion of the exhaust-gas flow. Given sufficient heat supply, a partial oxidation may thus already take place in the region in front of the gas discharge, on the one hand, and the processing agent is already so thoroughly mixed with the exhaust gas that further oxidation may commence immediately in the region of the gas discharge, on the other hand.

Providing a second orifice advantageously allows the additional supply of oxygen and promotes an efficient conveying of the radical-enriched exhaust gas-fuel mixture in the direction of the aftertreatment system.

In a simple manner, a spark plug, which has been known for a long time already, may be used as an excitation means for a gas discharge. The spark plug is located in spatial proximity to the means of supply of the processing agent, so that the exhaust gas-fuel mixture may effectively be enriched with radicals.

DETAILED DESCRIPTION

Figure 1:
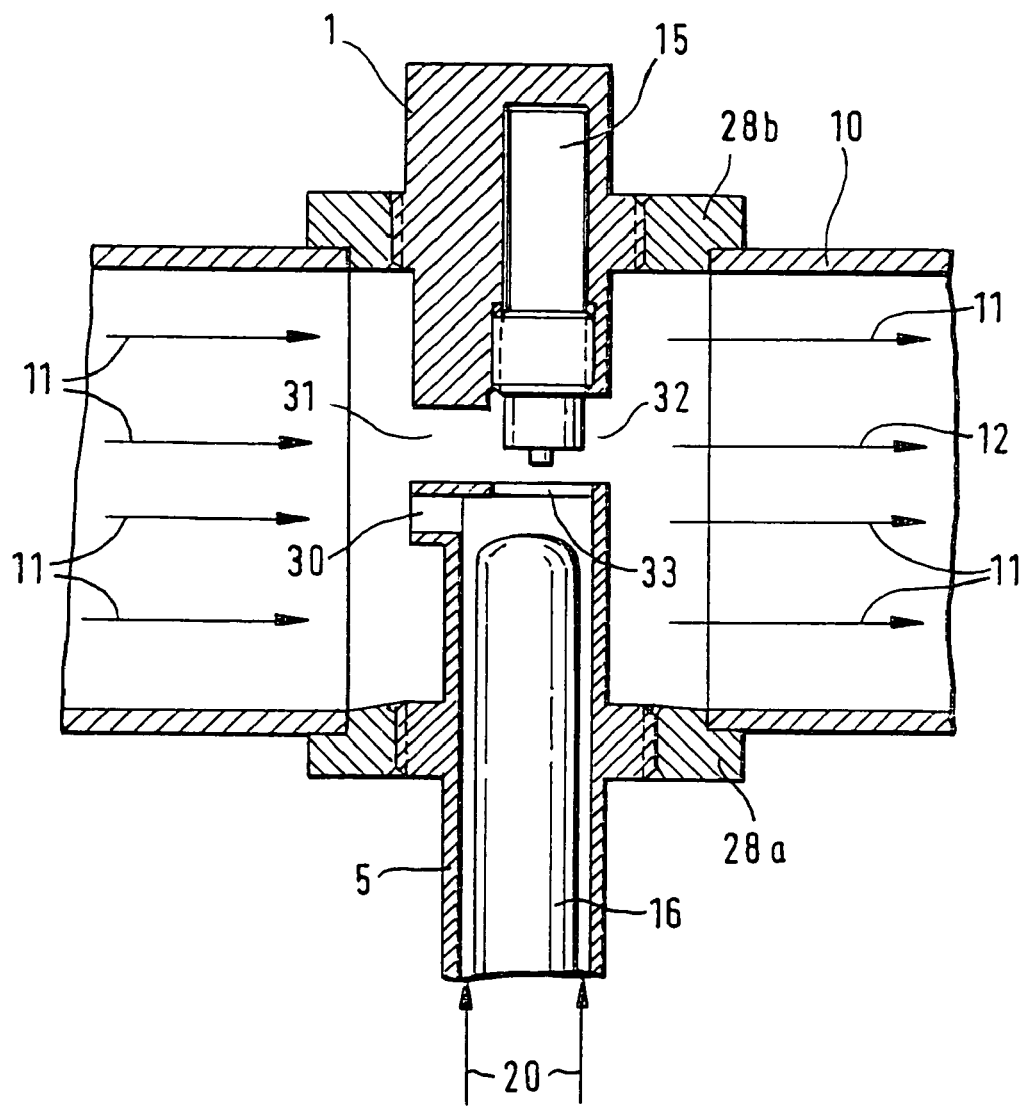
FIG. 1 shows a cross-sectional lateral view of a device for introducing a processing agent downstream of the engine.

FIG. 1 shows a device 1 for the introduction of a processing agent downstream of the engine into exhaust flow 11 of an internal combustion engine. The device is mounted on exhaust pipe 10 by means of threaded sleeves 28a and/or 28b. The mounting seals the exhaust pipe in a gas-tight manner and exhaust gas 11 is able to flow around the device since it does not take up the entire cross section of the exhaust pipe. Device 1 has a cylindrical body 5 toward fuel supply 20 into the exhaust-gas tract. Cylindrical body 5 has an electrically heated glow plug 16 in its interior. At its end projecting into the exhaust-gas flow, cylindrical body 5 has an orifice 30 whose cross section is arranged roughly perpendicularly to the flow direction of exhaust gas 11. Furthermore, a circular feed-through orifice 33 has been introduced in the cylindrical body, which is perpendicular to orifice 30 and establishes a connection to a through-channel formed by a second orifice 31 and a third orifice 32. An electrically operated spark plug 15 projects into the through-channel above feed-through orifice 33. Downstream from the device, the exhaust gas flow contains exhaust-gas components 12, which are mixed with radicals and/or partially oxidized fuel molecules.

Exhaust gas 11 coming from an internal combustion engine meets device 1 and partially flows around it. However, because of orifices 30 and 31, exhaust gas also passes through the device, to the other side of the device, to the downstream exhaust-gas aftertreatment system, such as a reducing catalyst for NOX reduction, or a particle filter. Via heating means (not shown further), preheated fuel 20 is introduced into the ring gap around sheathed-element glow plug 16. The fuel evaporates and, in the region between orifice 30 and feed-through orifice 33, is mixed with exhaust gas flowing into orifice 30. A partial oxidation of the fuel already takes place at the hot tip of the sheathed-element glow plug. The mixture flows further through feed-through orifice 33. An electric arc is burning between this orifice and the tip of spark plug 15. This electric arc forms reactive radicals and increases the enthalpy of the mixture. Via orifice 31, additional oxygen reaches this second reaction zone together with the exhaust gas, so that the fuel continues to oxidize downstream from spark plug 15 once it has passed orifice 32.

Figure 2:
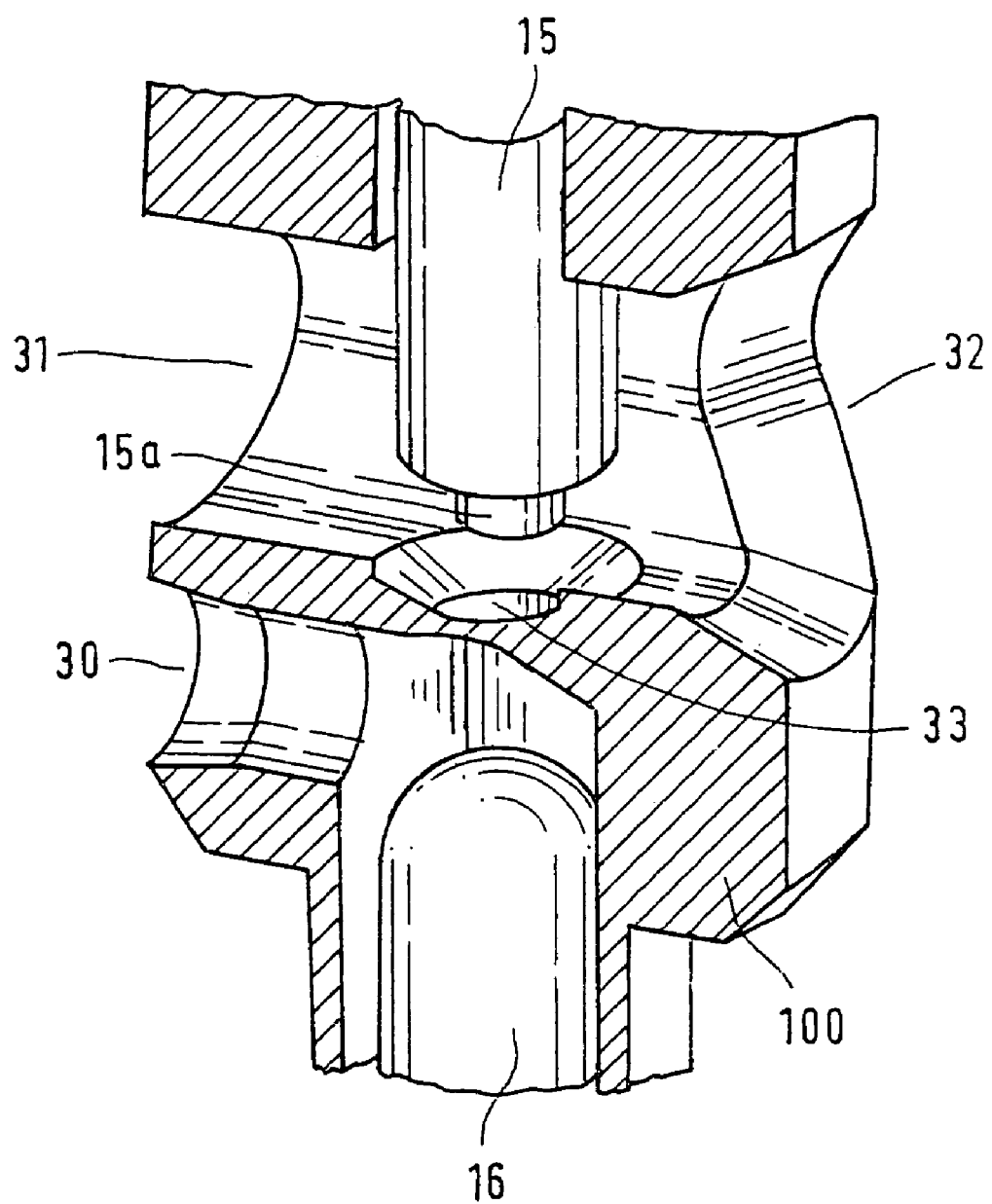
FIG. 2 shows a perspective sectional view of a cut-away portion of the device.

FIG. 2 shows a cut-away portion 100 of device 1 in a perspective sectional view. The device is embodied as monolithic metal block in which orifices 30, 31, 32 and 33 are formed as bores. The bores are cylindrical, orifice 32, like orifice 30, having at its end a conically formed transition area. The ceramic body of spark plug 15 electrically insulates tip 15a of the spark plug from the metal block.

If spark plug 15 is electrically controlled by the requisite ignition voltage, a gas discharge is excited between tip 15a of the spark plug and feed-through orifice 33. The fuel-exhaust-gas mixture entering from sheathed-element glow plug 16 through feed-through orifice 33 is additionally enriched via feed-through orifice 31 with oxygen present in the exhaust gas and excited in the burning electric arc to form reactive radicals. The mixture mixed with radicals leaves the device through orifice 32 and oxidizes further, so that a downstream aftertreatment system is able to be supplied with heated and oxygen-rich exhaust gases.

The device according to the present invention may be used in different aftertreatment systems, since an at least partial oxidation of the fuel in front of the exhaust-gas aftertreatment system is desired both in the regeneration of catalytic converters with hydrocarbon trap and in the regeneration of particle filters. In catalytic converters with hydrocarbon trap, any oxygen present in the exhaust gas must be reduced, and in the particle filter, the fuel oxidation results in the desired temperature increase in the exhaust gas as required for particle-filter regeneration.

In the device according to the present invention, the means for supplying fuel and the spark plug that forms the electric arc are arranged on one axis, the fuel vapor flowing in the direction of the spark plug. However, in an alternative specific embodiment, the spark plug may also be arranged slightly to the side or in the flow direction, at an offset relative to sheathed-element glow plug 16, as long as it is ensured that the fuel vapor is incorporated in the electric arc that forms between the metal block and the spark plug, that is, as long as the supply means may interact with the spark plug, in the sense that an at least partial oxidation of the supplied processing agent may be supported prior to entrance into the aftertreatment system.

In an additional alternative specific embodiment, it is also possible to introduce the fuel into the ring gap between cylindrical body 5 and sheathed-element glow plug 16 already in pre-vaporized form, so that the sheathed-element glow plug is used only for converting already condensed-out fuel back into the gas phase again, thereby ensuring that no fuel in liquid form can reach, for example, the downstream catalytic converter, or that no fuel may condense out there.

The invention claimed is:

1. A device for introducing a processing agent downstream of an engine into an exhaust gas of an internal combustion engine flowing one of into an aftertreatment system and into a particle filter, comprising:
   an arrangement for supplying the processing agent;
   a supply apparatus provided with a reciprocally acting arrangement for exciting a gas discharge, wherein:
      an at least partial oxidation of the processing agent is supported prior to entering the aftertreatment system; and
   an arrangement for conveying the exhaust gas and via which a reciprocal action of the supply apparatus and the reciprocally acting arrangement for exciting the gas discharge are implemented, wherein:
      the arrangement for conveying the exhaust gas subdivides a region between the supply apparatus and the reciprocally acting arrangement for exciting the gas discharge in such a way that the processing agent first mixes with a portion of an exhaust-gas stream before being conveyed to the reciprocally acting arrangement for exciting the gas discharge,
      the supply apparatus and the reciprocally acting arrangement for exciting the gas discharge are arranged in such a way relative to one another that a supply of the processing agent to the reciprocally acting arrangement for exciting the gas discharge is implemented in a direction that is perpendicular to a flow direction of the exhaust gas,
      the arrangement for conveying the exhaust gas includes three orifices,
      a first orifice of the three orifices conveys a portion of an exhaust-gas flow to the supply apparatus,
      a second orifice of the three orifices conveys a further portion of the exhaust-gas stream to the reciprocally acting arrangement for exciting the gas discharge, and
   a third orifice of the three orifices discharges the exhaust gas mixed with radicals into the aftertreatment system.

2. The device as recited in claim 1, wherein:
the aftertreatment system includes a reducing catalyst for NOx reduction.

3. The device as recited in claim 1, further comprising:
threaded sleeves for connection to an exhaust pipe conveying the exhaust-gas stream.

4. The device as recited in claim 1, wherein:
the processing agent includes a reducing agent for lowering an oxygen present in the exhaust gas.

5. The device as recited in claim 1, wherein:
the reciprocally acting arrangement for exciting the gas discharge includes an arrangement for generating an electric arc.

6. The device as recited in claim 5, wherein:
the arrangement for generating the electric arc includes a spark plug.

7. The device as recited in claim 1, wherein:
the processing agent is a fuel.

8. The device as recited in claim 7, wherein:
the fuel is a diesel fuel.

9. The device as recited in claim 1, wherein:
the supply apparatus includes a device for converting the processing agent into a gaseous phase.

10. The device as recited in claim 9, wherein:
the device for converting the processing agent includes a heating unit.

11. The device as recited in claim 10, wherein:
the heating unit includes an electrically heated sheathed-element glow plug.

12. The device as recited in claim 10, wherein:
the device for converting the processing agent includes a hollow body projecting into the exhaust-gas stream,
an interior of the hollow body is separated from the exhaust-gas stream by a wall having a terminal opening,
the processing agent is introduced into the interior of the hollow body, and
the device for converting the processing agent is arranged in the interior of the hollow body.

13. The device as recited in claim 12, wherein:
an inner wall of the hollow body surrounds the heating unit with low clearance.

* * * * *